United States Patent
Kusuura (10) Patent No.: US 8,922,355 B2
(45) Date of Patent: Dec. 30, 2014

(54) HAPTIC FEEDBACK DEVICE USING ELECTRO-RHEOLOGICAL FLUID

(75) Inventor: Takahisa Kusuura, Kawasaki (JP)

(73) Assignee: Empire Technology Development LLC, Wilmington, DE (US)

(*) Notice: Subject to any disclaimer, the term of this patent is extended or adjusted under 35 U.S.C. 154(b) by 410 days.

(21) Appl. No.: 13/143,093

(22) PCT Filed: Jan. 13, 2011

(86) PCT No.: PCT/US2011/021191
§ 371 (c)(1),
(2), (4) Date: Jul. 1, 2011

(87) PCT Pub. No.: WO2012/096666
PCT Pub. Date: Jul. 19, 2012

(65) Prior Publication Data
US 2012/0182135 A1    Jul. 19, 2012

(51) Int. Cl.
*H04B 3/36* (2006.01)
*G06F 3/01* (2006.01)
*G06F 3/00* (2006.01)

(52) U.S. Cl.
CPC ............... *G06F 3/014* (2013.01); *G06F 3/016* (2013.01); *G06F 3/00* (2013.01)
USPC .............. 340/407.1; 340/407.2; 414/5; 414/6

(58) Field of Classification Search
USPC ........... 340/407.1, 407.2; 414/5, 6, 2; 901/33, 901/34
See application file for complete search history.

(56) References Cited

U.S. PATENT DOCUMENTS

| | | |
|---|---|---|
| 5,222,895 A | 6/1993 | Fricke |
| 6,310,604 B1 | 10/2001 | Furusho et al. |
| 6,430,843 B1 | 8/2002 | Potter et al. |
| 2001/0043847 A1 | 11/2001 | Kramer |
| 2003/0067245 A1 | 4/2003 | Pelrine et al. |
| 2004/0012557 A1 | 1/2004 | Daniel |
| 2006/0099808 A1* | 5/2006 | Kondo .......................... 438/674 |

(Continued)

FOREIGN PATENT DOCUMENTS

| | | |
|---|---|---|
| JP | H04-366605 A | 12/1992 |
| JP | H07-328979 A | 12/1995 |

(Continued)

OTHER PUBLICATIONS

Bickmore, T. W., Fernando, R., Ring, L., & Schulman, D. (2010). Empathic Touch by Relational Agents. IEE Transactions of Afftective Computing, 1(1), 60-71. Retrieved from http://www.computer.org/portal/web/csdl/transactions/tac#4.

(Continued)

*Primary Examiner* — Steven Lim
*Assistant Examiner* — Hongmin Fan
(74) *Attorney, Agent, or Firm* — Maschoff Brennan (57) ABSTRACT

Embodiments described herein generally relate to haptic feedback devices. In some examples, a haptic feedback device is described. An example haptic feedback device may include a first layer including multiple discrete fluid chambers. The example haptic feedback device may also include a second layer coupled to the first layer and including multiple interconnected micro-chambers containing an electro-rheological fluid. The example haptic feedback device may also include multiple electrodes positioned on opposing first and second sides of the interconnected micro-chambers.

34 Claims, 8 Drawing Sheets

(56) References Cited

U.S. PATENT DOCUMENTS

| | | | |
|---|---|---|---|
| 2009/0002328 A1* | 1/2009 | Ullrich et al. | 345/173 |
| 2009/0250267 A1 | 10/2009 | Heubel et al. | |
| 2010/0141407 A1 | 6/2010 | Heubel et al. | |
| 2010/0177050 A1 | 7/2010 | Heubel et al. | |
| 2010/0271295 A1 | 10/2010 | Braun et al. | |
| 2010/0302199 A1 | 12/2010 | Taylor et al. | |

FOREIGN PATENT DOCUMENTS

| | | |
|---|---|---|
| JP | H08-090458 A | 4/1996 |
| JP | H09-297544 A | 11/1997 |
| JP | H11-085433 A | 3/1999 |
| JP | 2000-020218 A | 1/2000 |
| JP | 2000056899 A | 2/2000 |
| JP | 2000-066806 A | 3/2000 |
| JP | 2000-081917 A | 3/2000 |
| JP | 2000-112618 A | 4/2000 |
| JP | 2001-054891 A | 2/2001 |
| JP | 2003-530913 A | 10/2003 |
| JP | 2004-029999 A | 1/2004 |
| JP | 2004-071765 A | 3/2004 |
| JP | 2004-154909 A | 6/2004 |
| JP | 2009047504 A | 3/2009 |
| KR | 10-2010-0136983 A | 12/2010 |
| WO | 96/02887 A1 | 2/1996 |
| WO | 2010/068571 A1 | 6/2010 |

OTHER PUBLICATIONS

Blake, J., & Gurocak, H. B. (2009). Haptic Glove With MR Brakes for Virtual Reality. IEEEASME Transactions on Mechatronics, 14(5), 606-615. Retrieved from http://ieeexplore.ieee.org/lpdocs/epic03/wrapper.htm?arnumber=4806267.

Mavroidis, C.; Bar-Cohen, Y.; Bouzit, M.; "Haptic Interfaces Using Electrorheological Fluids" Chapter 19.

Bickmore, t; Fernando, R., "Towards Empathic Touch by Relational Agents", Northeastern College of Computer and Information Science.

Sasaki, H., and Fujita, K., "Experimental Analysis of Role of Visual Information in Hardness Cognition Displayed by a ForceDisplay System and Effect of Altered Visual Information," vol. 5, No. 1, 2000, 8 pgs (English Abstract).

"Electroheological Fludis," accessed at http://web.archive.org/web/20051104043614/http://www.aist.go.jp/MEL/soshiki/kyoku/seimitsu/Korenaga/koreer_j.htm, on Jan. 28, 2014, Sep. 1998, 3 pgs.

International Search Report and Written Opinion for International Application No. PCT/US2011/021191 mailed on May 17, 2011, 11 pgs.

* cited by examiner

HAPTIC FEEDBACK DEVICE USING ELECTRO-RHEOLOGICAL FLUID

BACKGROUND

Unless otherwise indicated herein, the materials described herein are not prior art to the claims in the present application and are not admitted to be prior art by inclusion in this section.

Augmented reality ("AR") creates a newly mixed reality by merging elements of a real-world environment with virtual reality data. For instance, computer graphics objects can be blended into real footage in real time for display to an end-user. Additionally, the scope of AR has expanded to include non-visual augmentation, such as haptic feedback, and broader application areas, such as advertising, navigation, military services and entertainment to name a few.

Various AR devices for representing haptic information have been proposed that are able to provide only a haptic sense or a force sense or are relatively complicated. Thus, interest has increased in improved haptic feedback devices.

SUMMARY

Some embodiments disclosed herein generally relate to haptic feedback devices.

In some examples, a haptic feedback device is described that can include a first layer including a multiple number of discrete fluid chambers. A second layer can be coupled to the first layer and can include a multiple number of interconnected micro-chambers containing an electro-rheological fluid. A multiple number of electrodes can be positioned on opposing first and second sides of the interconnected micro-chambers.

In some examples, a system is described that can include a haptic feedback device. The haptic feedback device can include a first layer including a multiple number of discrete fluid chambers. A second layer can be coupled to the first layer and can include a multiple number of interconnected micro-chambers containing an electro-rheological fluid. A multiple number of electrodes can be positioned on opposing first and second sides of the interconnected micro-chambers. The system can also include a pressure source hydraulically coupled to the discrete fluid chambers of the first layer of the haptic feedback device. The system can also include a power source electrically coupled to the electrodes of the haptic feedback device. The system can also include a control module electrically coupled to the pressure source and the power source.

In some examples, methods of haptically representing virtual objects in contact with a person in an augmented reality space are described that can include selectively pressurizing a subset of a multiple number of discrete fluid chambers included in a first layer of a haptic feedback device worn by the person. A hardness distribution can be generated in a second layer of the haptic feedback device and the second layer can be coupled to the first layer and positioned between the first layer and the person. Pressure from the first layer can be transmitted through the hardness distribution of the second layer to the person to evoke, in the person, a haptic sense indicative of contact with the virtual object and a force sense indicative of a hardness of the virtual object.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments disclosed herein relate generally to haptic feedback devices configured to haptically represent virtual objects in contact with a person in an AR space. Example haptic feedback devices can be implemented as a glove or other suitable item configured to be worn by a person and to convey haptic information to the person. Example embodiments may include a first layer, a second layer, and multiple electrodes. The first layer may include multiple discrete fluid chambers. The second layer may be coupled to the first layer and may include multiple interconnected micro-chambers containing an electro-rheological ("ER") fluid. The electrodes may be positioned on opposing first and second sides of the interconnected micro-chambers of the second layer.

Example embodiments may also include a pressure source, a power source, and a control module. The pressure source may be hydraulically coupled to the discrete fluid chambers of the first layer of the haptic feedback device so as to selectively pressurize the discrete fluid chambers. The power source may be electrically coupled to the electrodes so as to selectively apply an electric field across the interconnected micro-chambers positioned between the electrodes. The control module may be electrically coupled to the pressure source and power source so as to control the pressure source and the power source.

In operation, a subset of the discrete fluid chambers of the first layer of the haptic feedback device can be selectively pressurized by a fluid controlled by the pressure source and according to a data signal provided by the control module to the pressure source. A hardness distribution can be generated in the second layer of the haptic feedback device by selectively applying an electric field through a subset of electrodes and across a subset of the interconnected micro-chambers in the second layer of the haptic feedback device by the power source and according to a data signal provided by the control module to the power source. Pressure from the pressurized subset of discrete fluid chambers of the first layer can be transmitted through the hardness distribution of the second layer to the person to evoke, in the person, a haptic sense indicative of contact with the virtual object and a force sense indicative of a hardness of the virtual object.

Figure 1:
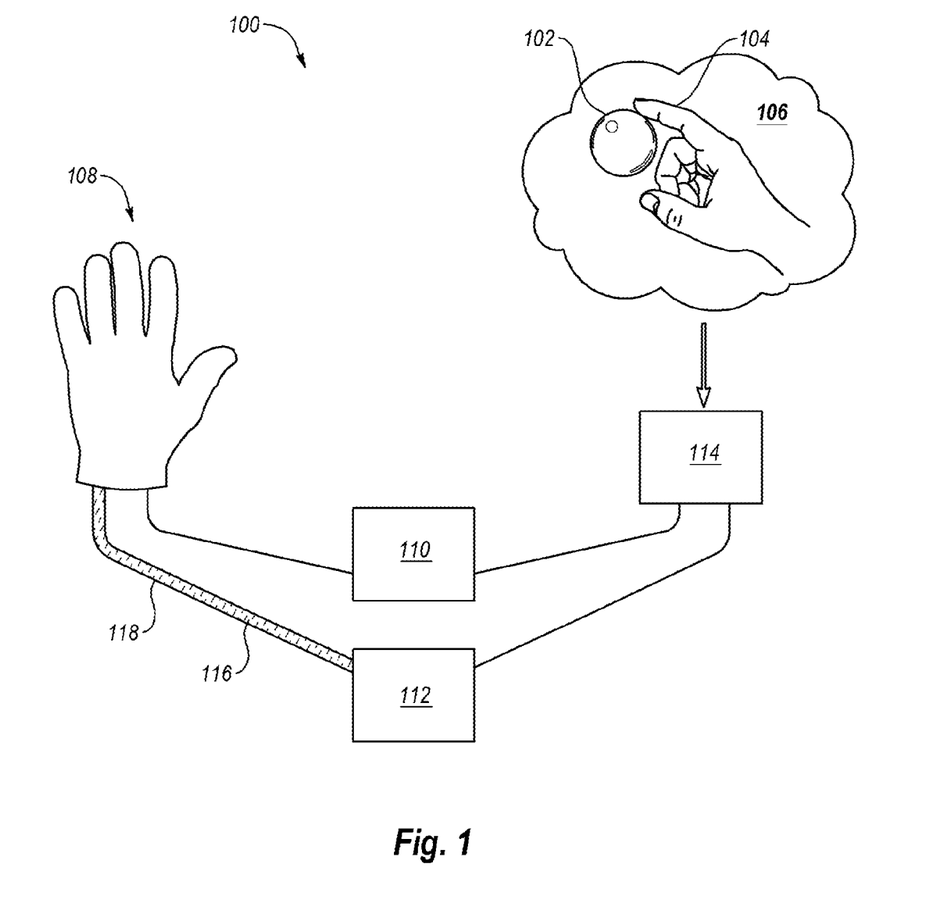
FIG. 1 is a block diagram of a system that includes a haptic feedback device.

FIG. 1 is a block diagram of a system 100 that includes a haptic feedback device, arranged in accordance with at least some embodiments described herein. Generally, the system 100 may be configured to haptically represent a virtual object 102 in contact with a body part 104 of a person in an AR space 106. For example, the system 100 may be configured to evoke, in the person, both a haptic sense indicative of contact with the virtual object 102 and a force sense indicative of a hardness of the virtual object 102.

In the illustrated embodiment, the system 100 includes a haptic feedback device 108, a power source 110, a pressure source 112, and a control module 114.

Briefly, the haptic feedback device 108 includes a first layer including multiple discrete fluid chambers, a second layer including multiple interconnected micro-chambers containing an ER fluid, and multiple electrodes positioned on opposing sides of the interconnected micro-chambers. The discrete fluid chambers in the first layer can be independently and selectively pressurized, to evoke, in a person wearing the haptic feedback device 108, a haptic sense indicative of contact with the virtual object 102. An electric field can be selectively applied through a subset of the electrodes and across a subset of the micro-chambers to alter an apparent viscosity of the ER fluid within the subset of the micro-chambers and thereby evoke, in the person wearing the haptic feedback device 108, a force sense indicative of a hardness of the virtual object 102. Additional details regarding the haptic feedback device 108 are provided below.

As illustrated in FIG. 1, the haptic feedback device 108 may be configured as a glove to be worn on a hand of a person. More generally, the haptic feedback device 108 may be configured to be worn on virtually any body part of a person. For instance, the haptic feedback device 108 could be configured as a glove, sock, pants, shirt, or mask to be generally worn, respectively, on a hand, foot, lower torso and legs, upper torso and arms, or face of a person.

The power source 110 is electrically coupled to the haptic feedback device 108. More particularly, the power source 110 may be electrically coupled to electrodes of the haptic feedback device 108. The power source 110 may be configured to selectively apply an electric field through the electrodes and across corresponding micro-chambers of the haptic feedback device 108 according to a data signal received from the control module 114. The apparent viscosity of the ER fluid contained within the micro-chambers can be altered as a function of the applied electric field according to some embodiments.

The pressure source 112 is hydraulically coupled to the haptic feedback device 108. More particularly, the pressure source 112 may be hydraulically coupled to the discrete fluid chambers of the haptic feedback device 108. The pressure source 112 may be configured to selectively pressurize the discrete fluid chambers of the haptic feedback device 108 according to a data signal received from the control module 114.

The control module 114 is electrically coupled to the power source 110 and the pressure source 112. The control module 114 may be configured to provide data signals to the power source 110 and the pressure source 112. The data signals may represent various states of contact between a person and the virtual object 102. For instance, each data signal may represent a different state of contact between the body part 104, such as the hand, of the person and the virtual object 102 within the AR space 106. Although not shown, the control module 114 may include or otherwise use a processor to execute computer-executable instructions stored in a memory or other data storage device.

The system 100 further includes a fluid 116 configured to be used by the pressure source 112 to selectively pressurize the discrete fluid chambers included in the haptic feedback device. The fluid 116 may be communicated to and from the haptic feedback device 108 by the pressure source 112 via one or more hoses 118 or other suitable fluid channels according to some embodiments.

In general, the fluid 116 may include a gas, liquid, or other fluid having a substantially uniform viscosity. For example, the fluid 116 may include air, water or oil.

The fluid 116 may have a viscosity of less than about 800 centipoise ("cP"). In some embodiments, the viscosity of the fluid 116 may range from about 0 centipoise ("cP") to about 800 cP. In other embodiments, the viscosity of the fluid 116 may range from about 0.0018 cP to about 100 cP.

Figure 2A:
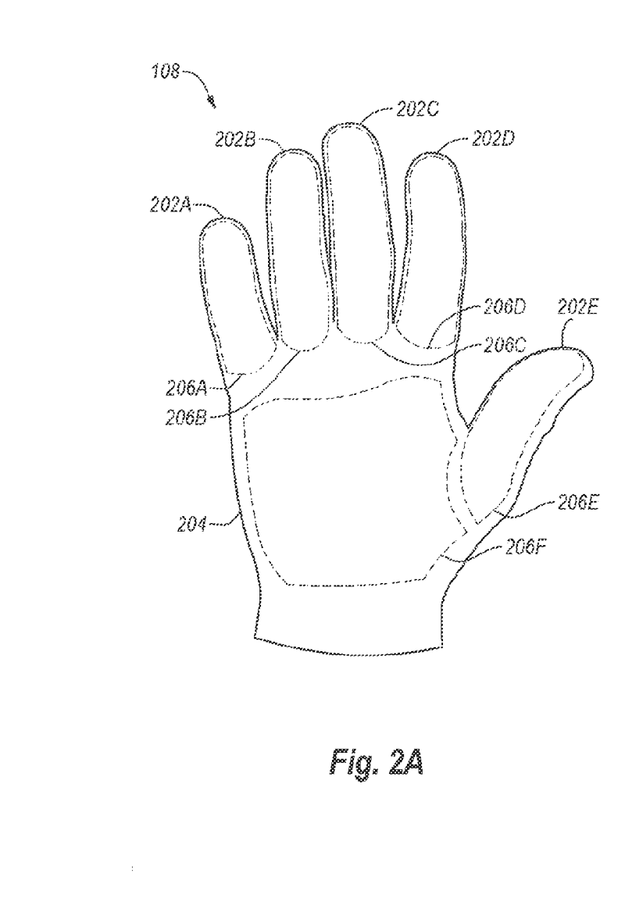
FIG. 2A shows an illustrative example of a front view of the haptic feedback device of FIG. 1.
Figure 2B:
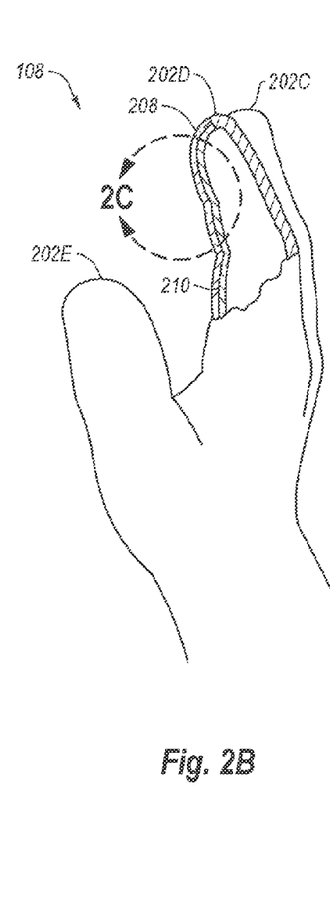
FIG. 2B shows an illustrative example of a partial cross-sectional side view of the haptic feedback device of FIG. 1.

FIG. 2A shows an illustrative example of a front view of the haptic feedback device 108 of FIG. 1, arranged in accordance with at least some embodiments described herein. FIG. 2B shows an illustrative example of a partial cross-sectional side view of the haptic feedback device 108 of FIG. 1, arranged in accordance with at least some embodiments described herein.

In the illustrated embodiment of FIG. 2A, the haptic feedback device 108 is a glove and includes multiple fingers 202A-202E and a palm 204. The haptic feedback device 108 further includes multiple discrete fluid chambers, denoted in FIG. 2A by dashed lines 206A-206F. Each of the discrete fluid chambers 206A-206F may correspond to a respective one of the fingers 202A-202E or the palm 204. Alternately, the haptic feedback device 108 may include multiple subsets of multiple discrete fluid chambers, each of the subsets corresponding to a respective one of the fingers 202A-202E or the palm 204. More generally, any number of discrete fluid chambers can be provided in the haptic feedback device 108 with the understanding that the greater the number of discrete fluid chambers, the finer the granularity in localizing haptic feedback on a body part of a person.

As depicted in FIG. 2B, the haptic feedback device 108 includes a first layer 208 and a second layer 210. The discrete fluid chambers 206A-206F of the haptic feedback device 108 may be formed in the first layer 208. With combined reference to FIGS. 2A-2B, the discrete fluid chambers 206A-206F formed in the first layer 208 may generally be provided on the front (e.g., the palm side) of the fingers 202A-202E and the palm 204. Alternately or additionally, the discrete fluid chambers 206A-206F formed in the first layer 208 may be provided on the sides and/or back of the fingers 202A-202E and the palm 204.

The second layer 210 of the haptic feedback device 108 may be coupled to the first layer 208. More generally, the second layer 210 may be positioned so as to be between the first layer 208 and the body part of a person when the haptic feedback device 108 is worn on the body part of the person.

Figure 2C:
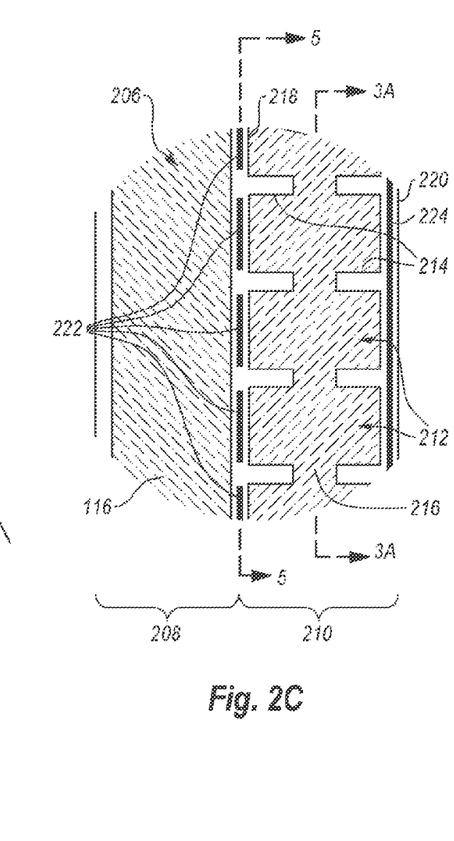
FIG. 2C shows an illustrative example of a detail cross-sectional view of a portion of first and second layers of the haptic feedback device of FIG. 1 in a region 2C of FIG. 2B.

FIG. 2C shows an illustrative example of a detail cross-sectional view of a portion of the first and second layers 208, 210 of haptic feedback device 108 in a region 2C of FIG. 2B, arranged in accordance with at least some embodiments described herein. In the illustrated embodiment of FIG. 2C, one of the discrete fluid chambers 206A-206F formed in the first layer 210 is shown and is denoted generically as discrete fluid chamber 206. The discrete fluid chamber 206 may be partially or completely filled with fluid 116.

The second layer 210 includes a multiple number of interconnected micro-chambers 212 defined by chamber dividers 214. An ER fluid 216 may partially or completely fill some or all of the micro-chambers 212 within the second layer 210. In general, an apparent viscosity of the ER fluid 216 may be reversibly changed in response to application of an electrical field.

The ER fluid 216 may have a relatively high yield stress, such as a yield stress of about 100 kilopascals ("kPA") or more. In some embodiments, the yield stress of the ER fluid 216 is about 200 kPA.

The ER fluid 216 may include a suspension of solid particles in an electrically insulating fluid including oil such as silicon oil. For instance, the solid particles of the suspension may include titanium oxide ("$TiO_2$"), polyaniline, microencapsulated polyaniline, poly(naphthalene quinine) radical, poly(p-phenylene), or other suitable material. In some embodiments, the solid particles of the suspension are nanoparticles.

With continued reference to FIG. 2C, the second layer 210 includes opposing first and second films 218, 220 containing the ER fluid 216 therebetween. The chamber dividers 214 are formed on the first and second films 218, 220. The first and second films 218, 220 and the chamber dividers 214 include resin in some embodiments. For instance, the first and second films 218, 220 and the chamber dividers 214 may include, but are not limited to, polyethylene terephthalate ("PET"), polycarbonate ("PC"), polyimide, polyamide, or polyamide-imide ("PAI").

The first electrodes 222 and the second electrodes 224 (collectively "electrodes 222, 224") may be respectively embedded within the first and second films 218, 220. According to some embodiments, each of the electrodes 222, 224 is a strip of substantially conductive material. For example, each of the electrodes 222, 224 may include conductive metal (s) such as copper, nickel, tin, silver, zinc, iron, gold, platinum, or the like or alloys thereof, conductive polymers, or the like or any combination thereof.

Additionally, the electrodes 222, 224 may be aligned in orthogonal directions. In particular, in the illustrated embodiment of FIG. 2C, the first electrodes 222 are aligned in a horizontal direction coming in and out of the drawing sheet while the second electrodes 224 (only one of which is depicted in FIG. 2C), are aligned in a vertical direction of the drawing sheet. Additional details regarding some embodiments of the electrodes 222, 224 are provided below with respect to FIGS. 5A-5B.

Figure 3A:
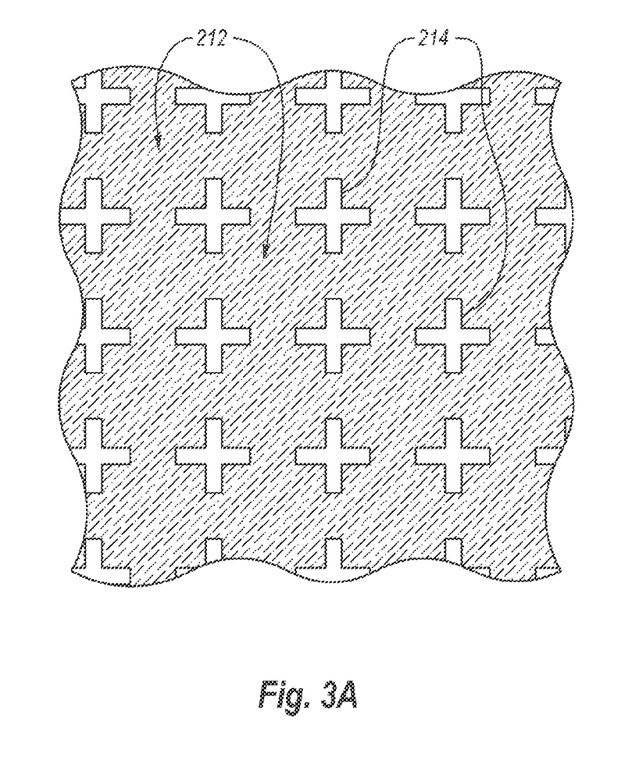
FIG. 3A shows an illustrative example of a cross-sectional view of a portion of the haptic feedback device of FIG. 1 along a cutting plane line 3A in FIG. 2C.

The micro-chambers 212 within the second layer 210 can have a variety of cross-sectional shapes. In this regard, FIG. 3A shows an illustrative example of a cross-sectional view of a portion of the haptic feedback device 108 of FIG. 1 along the cutting plane line 3A in FIG. 2C, arranged in accordance with at least some embodiments described herein. In the illustrated embodiment of FIG. 3A, the configuration of the chamber dividers 214 is such that the micro-chambers 212 have a generally square cross-sectional shape.

Figure 3B:
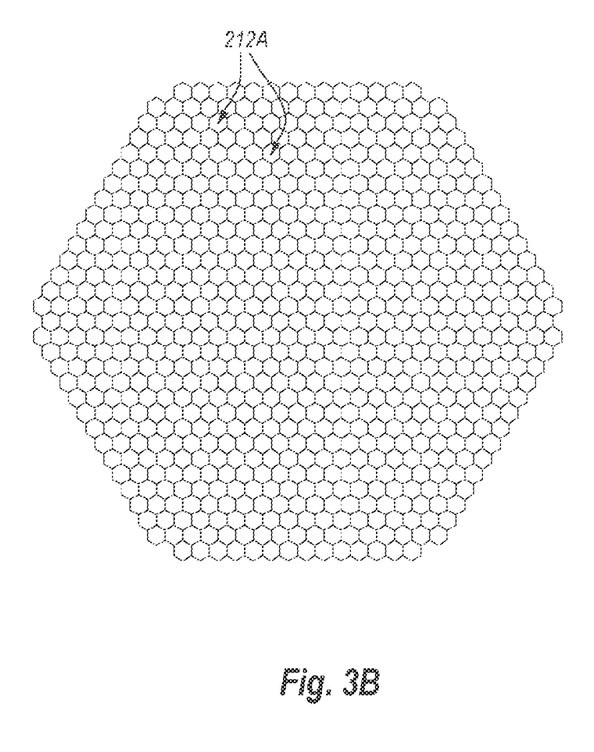
FIG. 3B shows an alternative embodiment of a cross-sectional view of a portion of the haptic feedback device of FIG. 1 along the cutting plane line 3A of FIG. 2C.

More generally, however, the chamber dividers 214 can be configured to define micro-chambers 212 having virtually any cross-sectional shape, including, but not limited to, square, rectangular, triangular, circular, hexagonal, or octagonal. For example, FIG. 3B shows an alternative embodiment of a cross-sectional view of a portion of the haptic feedback device 108 of FIG. 1 along the cutting plane line 3A in FIG. 2C. In the illustrated embodiment of FIG. 3B, micro-chambers 212A have a hexagonal cross-sectional shape.

Figure 4A:
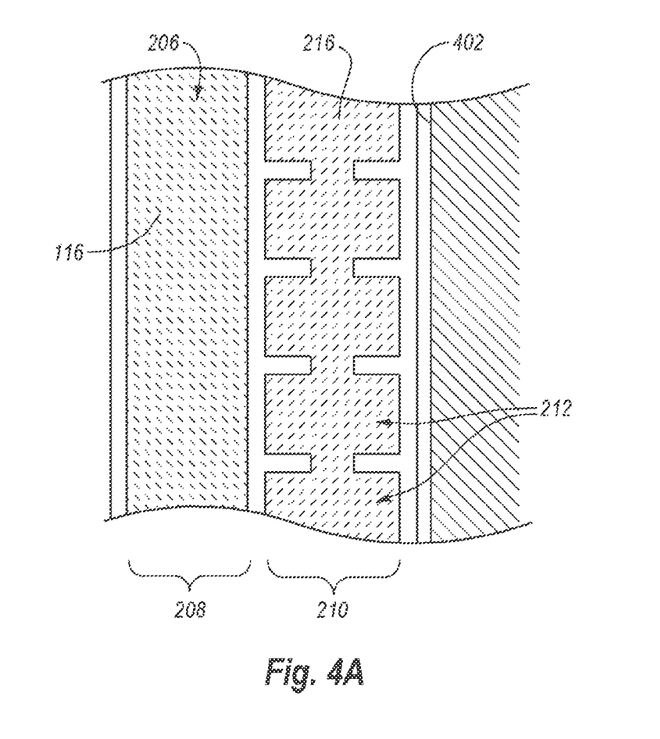
FIGS. 4A-4B show illustrative examples of various operation modes of the haptic feedback device of FIG. 1.
Figure 4B:
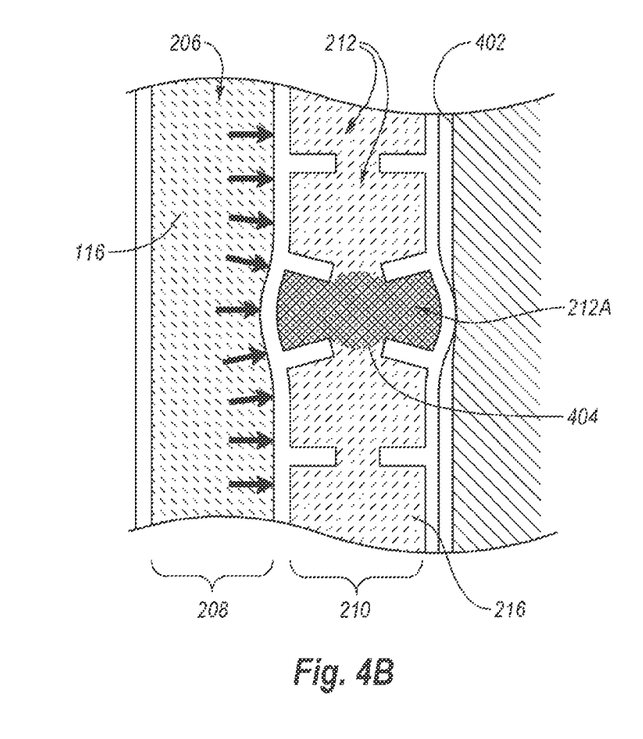

FIGS. 4A-4B show illustrative examples of various operation modes of the haptic feedback device 108 of FIG. 1, arranged in accordance with at least some embodiments described herein. In FIGS. 4A-4B, a body part 402 of a person may be positioned proximate the second layer 210 of haptic feedback device 108 when the person is wearing the haptic feedback device 108 on the body part 402. The second layer 210 is positioned between the first layer 208 and the body part 402.

FIG. 4A depicts a mode of the haptic feedback device 108 configured to represent a state in which the person's body part 402 is not in contact with a virtual object in a corresponding AR space. In particular, in FIG. 4A, while a discrete fluid chamber 206 in the first layer 208 may include some fluid 116, the fluid 116 has not pressurized the discrete fluid chamber 206. Further, an electric field has not been applied across any of the micro-chambers 212 such that the ER fluid 216 has a relatively low viscosity in the micro-chambers 212. Accordingly, the person's body part 402 may not experience any contact, or may experience only incidental contact, with the second layer 210. The lack of contact or only incidental contact of the person's body part 402 with the second layer 210 may haptically represent a lack of contact between the person's body part 402 and the virtual object.

In contrast, FIG. 4B depicts a mode of the haptic feedback device 108 configured to represent a state in which the person's body part 402 is in contact with and applying a force to the virtual object. In particular, in FIG. 4B, the discrete fluid chamber 206 is pressurized by, e.g., pumping additional fluid 116 into the discrete fluid chamber 206. Additionally, an electric field has been applied across a particular micro-chamber 212A to increase the apparent viscosity of the ER fluid 216 within the second layer 210 and create a hard region denoted at 404.

Pressure from the first layer 208 is then transmitted through the second layer 210 to the person's body part 402, urging the second layer 210 against the person's body part 402. Because the apparent viscosity of the ER fluid 216 within the micro-chamber 212A has been increased, the ER fluid 216 within the micro-chamber 212A is at least partially trapped within the micro-chamber 212A, creating the hard region 404. In comparison, because the apparent viscosity of the ER fluid 216 within the other micro-chambers 212 is relatively low, the ER fluid 216 within the other micro-chambers 212 can flow out of the other micro-chambers 216 away from the micro-chamber 212A. Accordingly, the pressure transmitted from the first layer 208 through the second layer 210 may be focused in one area of the person's body part 402 through the hard region 404.

Figure 5:
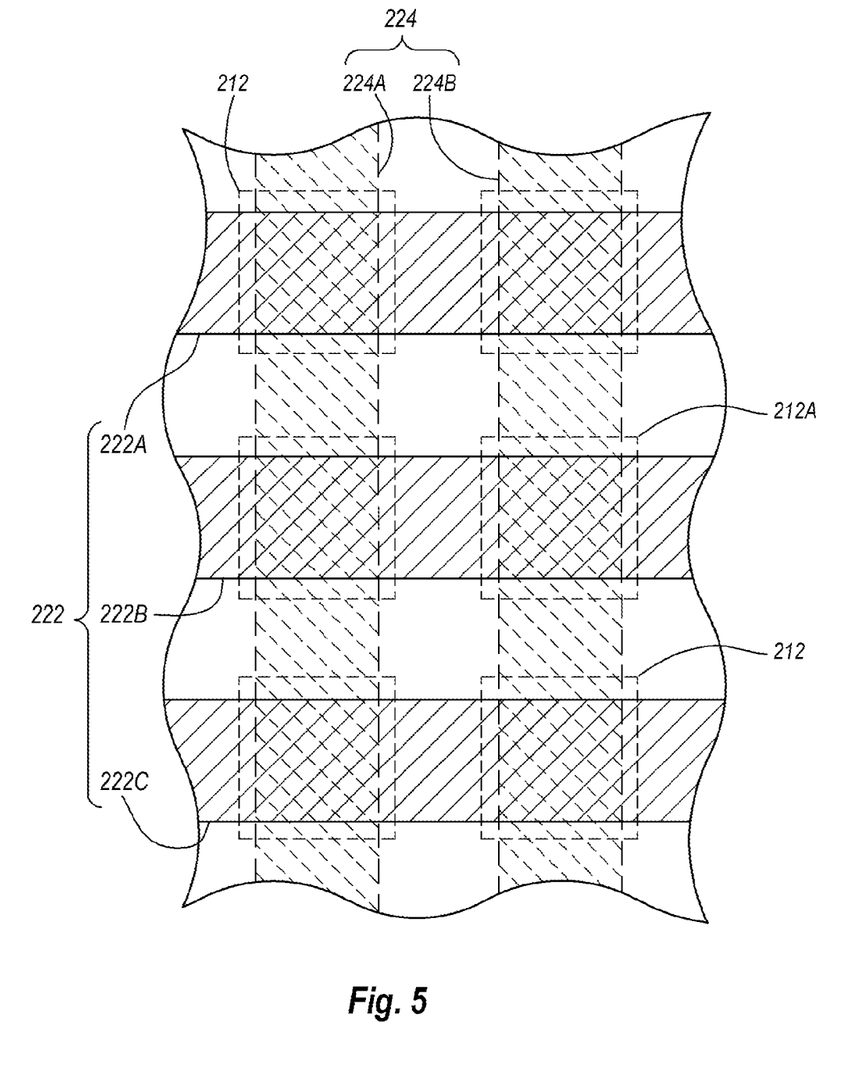
FIG. 5 shows an illustrative example of a cross-sectional view of a portion of the haptic feedback device of FIG. 1 along a cutting plane line 5 in FIG. 2C.

FIG. 5 shows an illustrative example of a cross-sectional view of a portion of the haptic feedback device 108 of FIG. 1 along the cutting plane line 5 in FIG. 2C, arranged in accordance with at least some embodiments described herein. In the illustrated embodiment of FIG. 5, the first electrodes 222 include first electrodes 222A-222C. The second electrodes 224 are denoted in FIG. 5 at 224A and 224B. The micro-chambers 212 interposed between the first and second electrodes 222, 224 are denoted in FIG. 5 by dotted lines and include a micro-chamber 212A.

As depicted in FIG. 5, the first and second electrodes 222, 224 may be aligned in orthogonal directions. The orthogonal alignment of the first and second electrodes 222, 224 allows an electric field to be independently applied to the micro-chambers 212 on an individual or grouped basis. For instance, to apply an electric field primarily across micro-chamber 212A, the electric field may be applied through the first electrode 222B and the second electrode 224B. As another example, to apply an electric field primarily across the micro-chamber 212A and the other micro-chambers 212 in the same column as the micro-chamber 212A, the electric field may be applied, through the first electrodes 222A-222C and the second electrode 224B.

Figure 6A:
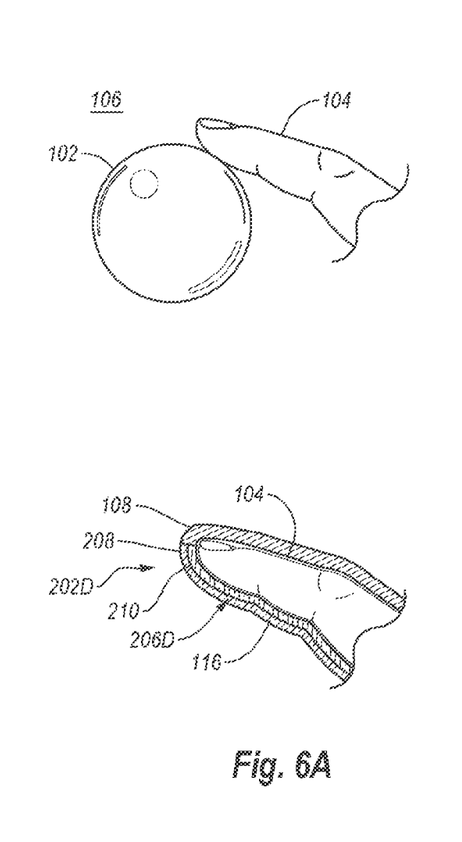
FIGS. 6A-6C show illustrative examples of various states of contact between a virtual object and a person in an AR space and various corresponding operation modes of the haptic feedback device of FIG. 1.
Figure 6B:
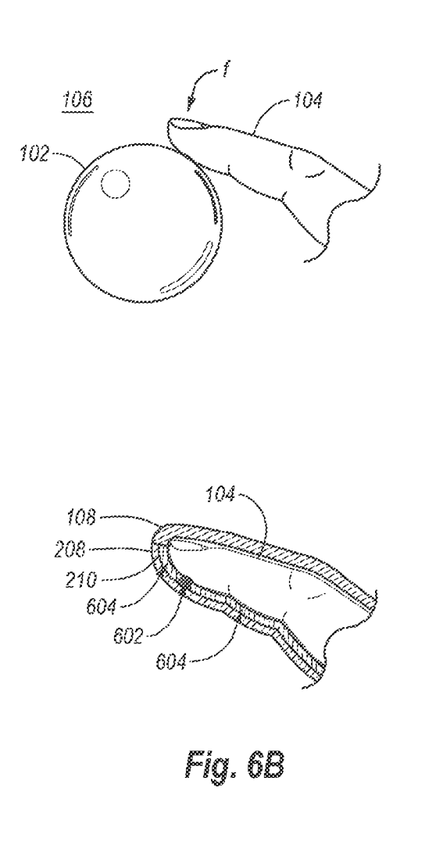
Figure 6C:
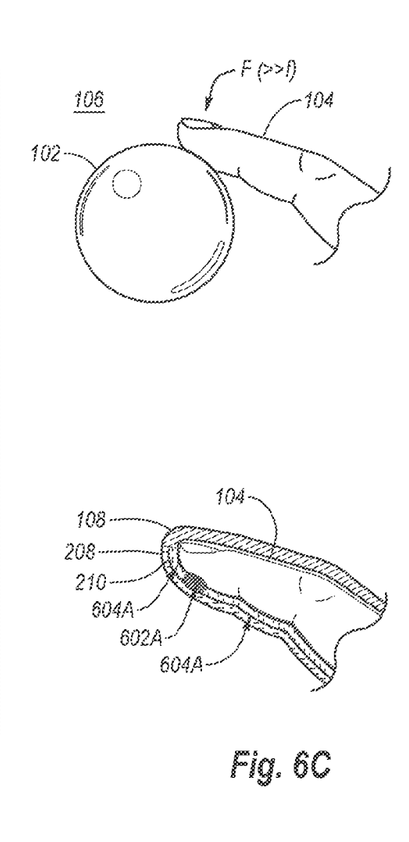

FIGS. 6A-6C show illustrative examples of various states of contact between the virtual object 102 and a person in the AR space 106 and various corresponding operation modes of the haptic feedback device 108 of FIG. 1, arranged in accordance with at least some embodiments described herein. The various operation modes of the haptic feedback device 108 may be configured to represent the various states of contact in accordance with at least some embodiments described herein.

For instance, the top of FIG. 6A illustrates the person's body part 104, such as the person's index finger, when it is initially brought into contact with the virtual object 102 in the AR space 106. With reference to the bottom of FIG. 6A, the discrete fluid chamber 206D within the first layer 208 in the index finger 202D of the haptic feedback device 108 may be pressurized with the fluid 116 to represent the state of contact associated with the top of FIG. 6A. Pressurization of the discrete fluid chamber 206D may be configured to evoke a haptic sense in the person indicative of contact with the virtual object 102.

With reference to the top of FIG. 6B, the person may move the body part 104 within the haptic feedback device 108 or other input may be provided representative of the body part 104 exerting a small force f on virtual object 102 within the AR space 106. With reference to the bottom of FIG. 6B, a hardness distribution may be generated within the second layer 210 while the discrete fluid chamber 206D is pressurized as described with respect to FIG. 6A to represent the state of contact associated with the top of FIG. 6B. The hardness distribution may include one or more hard areas 602 and one or more soft areas 604. According to some embodiments, the hardness distribution may be generated by selectively applying an electric field across a first subset of the micro-chambers 212 (FIG. 2C) in the second layer 210 that correspond to the hard areas 602. Pressure from the pressurized discrete fluid chamber 206D in the first layer 208 may then be transmitted through the hardness distribution of the second layer 210 to evoke, in the person, both a haptic sense indicative of contact with the virtual object 102 and a force sense indicative of a hardness of the virtual object 102.

With reference to the top of FIG. 6C, the person may alternately or additionally move the body part 104 within the haptic feedback device 108 or other input may be provided representative of the body part 104 exerting a large force F on the virtual object 102 within the AR space 106. The large force F may be greater in magnitude than the small force f. With reference to the bottom of FIG. 6C, another hardness distribution may be generated within the second layer 210 that is different than the hardness distribution of FIG. 6B while the discrete fluid chamber 206D is pressurized as described with respect to FIG. 6A to represent the state of contact associated with the top of FIG. 6C. In particular, the hardness distribution of FIG. 6C may include a relatively larger hard area 602A and relatively smaller soft areas 604A by increasing the number of the micro-chambers 212 (FIG. 2C) across which the electric field is applied relative to the example of FIG. 6B. Alternately or additionally, the hardness of the hard area 604A may be altered relative to the hardness of the hard area 604 of FIG. 6B by altering the magnitude of the applied electric field.

Figure 7:
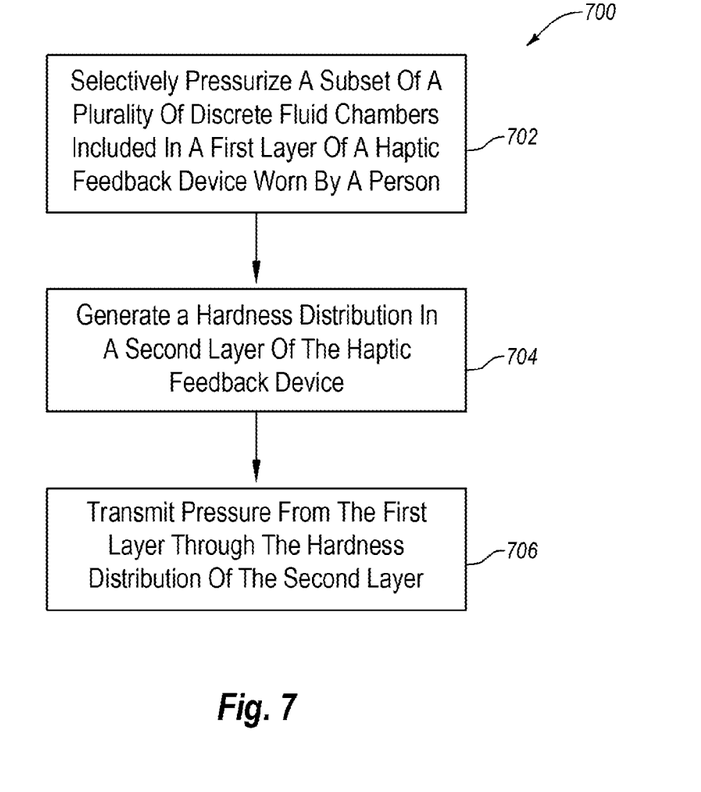
FIG. 7 shows an example flow diagram of a method for haptically representing virtual objects in contact with a person in an AR space.

FIG. 7 shows an example flow diagram of a method 700 for haptically representing virtual objects in contact with a person in an AR space arranged in accordance with at least some embodiments described herein. The method 700 includes various operations, functions or actions as illustrated by one or more of blocks 702, 704 and 706. The method 700 may begin at block 702.

In block 702, a subset of a multiple number of discrete fluid chambers included in a first layer of a haptic feedback device worn by a person can be selectively pressurized. The haptic feedback device may be a haptic feedback device arranged in accordance with at least some of the embodiments described herein. Accordingly, in some embodiments, selectively pressurizing the subset of the discrete fluid chambers may include the pressure source 112 of FIG. 1 pressurizing one or more of the discrete fluid chambers 206A-206F of FIG. 2A using the fluid 116 of FIG. 1. Block 702 may be followed by block 704.

In block 704, a hardness distribution can be generated in a second layer of the haptic feedback device. The second layer of the haptic feedback device may be coupled to the first layer of the haptic feedback device and may be positioned between the first layer and the person. In some embodiments, generating a hardness distribution in the second layer of the haptic feedback device may include selectively applying an electric field across a subset of a multiple number of interconnected micro-chambers of the second layer to alter an apparent viscosity of a portion of an ER fluid contained in the subset of micro-chambers where the ER fluid is contained throughout all of the micro-chambers. Block 704 may be followed by block 706.

In block 706, pressure can be transmitted from the first layer through the hardness distribution of the second layer to the person wearing the haptic feedback device. In some embodiments, transmitting pressure from the first layer through the hardness distribution of the second layer may be configured to evoke, in the person wearing the haptic feedback device, a haptic sense indicative of contact with the virtual object and a force sense indicative of a hardness of the virtual object.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, other functions and operations not shown in FIG. 7 or described above can be included in the method 700. As an example, the method 700 may further include increasing a magnitude of the applied electric field to increase a magnitude of the hardness of the virtual object perceived by the person.

As another example, the method 700 may further include decreasing a magnitude of the applied electric field to decrease a magnitude of the hardness of the virtual object perceived by the person.

Figure 8:
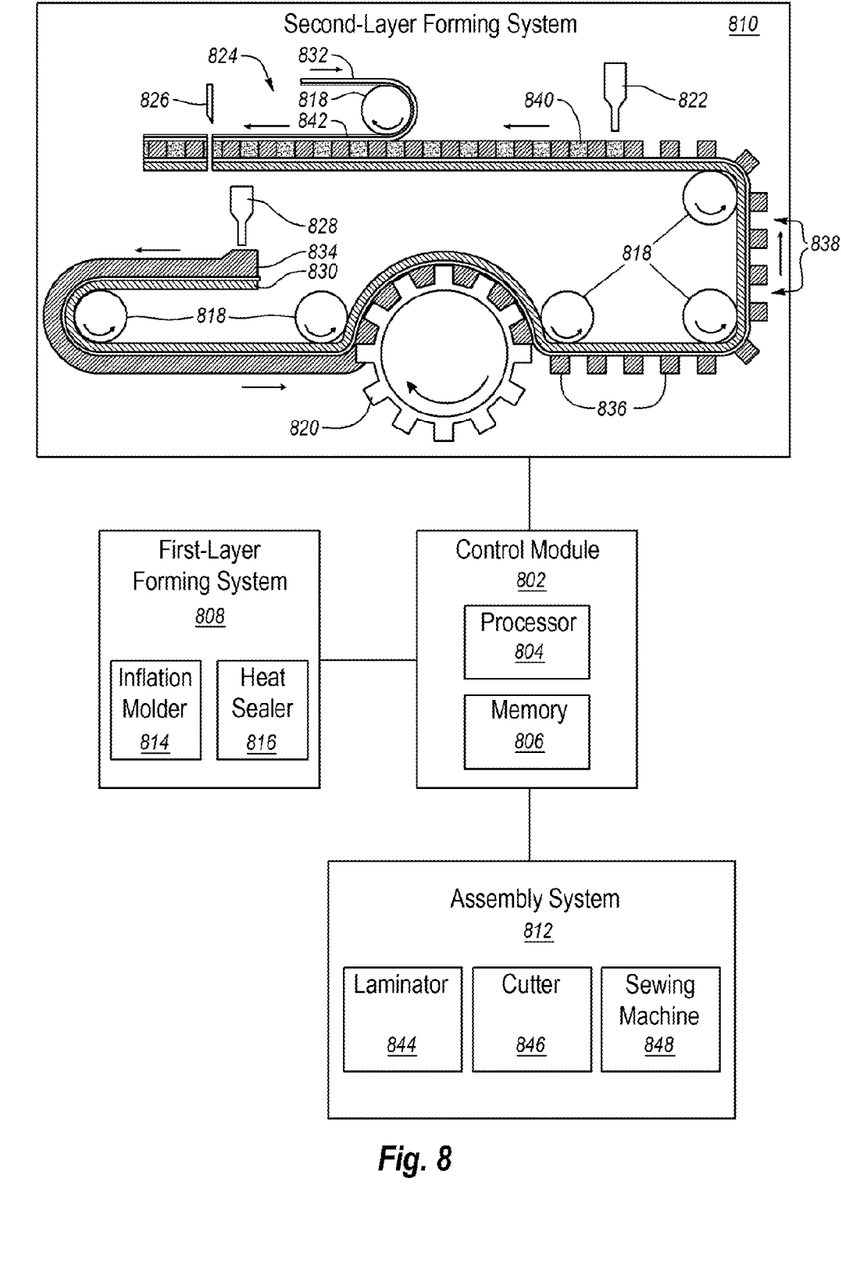
FIG. 8 is a block diagram of an illustrative embodiment of a system suitable to form a haptic feedback device, all arranged according to at least some embodiments described herein.

FIG. 8 is a block diagram of an illustrative embodiment of a system 800 suitable to form a haptic feedback device, such as the haptic feedback device 108 of FIG. 1, arranged in accordance with at least some embodiments described herein. FIG. 8 illustrates that some or all of the components for forming a haptic feedback device can be controlled automatically. A control module 802 may use a processor 804 to execute computer-executable instructions stored in a memory 806. The control module 802 can be coupled to one or more of a first-layer funning system 808, a second-layer forming system 810, and an assembly system 812.

The control module 802 may be configured to control one or more of systems 808, 810 and 812, or portions thereof to perform one or more of the functions or actions set forth below in an automated or semi-automated manner.

The first-layer forming system 808 may be configured to form a first layer material including multiple discrete fluid chambers. The first layer material may ultimately be incorporated into a haptic feedback device where the first layer material is implemented as the first layer, such as the first layer 208 of FIGS. 2A-2C, of the haptic feedback device. The first-layer forming system 808 may include, for example, an inflation molder 814 and a heat sealer 816.

The inflation molder 814 may be configured to form a hollow first layer material from any suitable material, including, but not limited to, PET, PC, polyimide, polyamide, or PAI.

The heat sealer 816 may be configured to seal the first layer material along predetermined lines to form discrete chambers within the first layer material. The discrete chambers formed in the first-layer material may be arranged in the first-layer material so as to correspond to the discrete fluid chambers 206A-206F of a finished haptic feedback device such as the haptic feedback device 108 described hereinabove.

The second-layer forming system 810 may be implemented as a roll-to-roll system and may be configured to form a second layer material including multiple interconnected micro-chambers filled with an ER fluid. The second layer material may ultimately be incorporated into a haptic feedback device where the second layer material is implemented as the second layer, such as the second layer 210 of FIGS. 2A-2C, of the haptic feedback device.

The second-layer forming system 810 may be implemented as a roll-to-roll system and may include, for example, multiple guiding rollers 818, an embossing roller 820, an ER fluid distributor 822, a lamination section 824, a cutter 826, and a chamber divider material distributor 828.

The guiding rollers 818 may be configured to guide various films 830, 832 through the second-layer forming system 810. The films 830, 832 may include any suitable material, including, hut not limited to, PET, PC, polyimide, polyamide, or PAI. Further, each of the films 830, 832 may include electrodes, such as the first and second electrodes 222, 224 of FIG. 5, embedded within each of the films 830, 832. The electrodes embedded within the films 830, 832 may be arranged such that when the films 830, 832 are coupled together in the lamination section 824, the electrodes in the film 830 are arranged orthogonally to the electrodes in the film 832.

The chamber divider material distributor 828 may be configured to deposit an unformed chamber divider material 834 on the film 830. The unformed chamber divider material 834 may be an un-set resin and may include, but is not limited to, PET, PC, polyimide, polyamide, or PAI.

The embossing roller 820 may be configured to form chamber dividers 836 that define interconnected micro-chambers 838.

Although not shown, a heat source or other component may optionally be included in the second-layer forming system 810 to provide a catalyst such as heat that may be effective to set the formed chamber dividers 836.

The ER fluid distributor 822 may be configured to deposit an ER fluid 840 in the micro-chambers 838. The ER fluid 840 may include submicron-particles, nano-particles, or particles having other suitable sizes. The particles of the ER fluid 840 may include, but are not limited to, $TiO_2$, polyaniline, microencapsulated polyaniline, poly(naphthalene quinine) radical, or poly(p-phenylene). Alternately or additionally, the ER fluid 840 may include a fluid such as silicon oil.

Optionally, the ER fluid 840 deposited by the ER fluid distributor 822 may include a light-weight emulsion configured to float to an upper surface of the deposited mass of the ER fluid 840. The light-weight emulsion at the upper surface may be configured to harden and seal the ER fluid 822 within the micro-chambers 838.

Alternately or additionally, after the ER fluid 840 is deposited by the ER fluid distributor 822, a seal solution may be deposited on the upper surface of the deposited mass of the ER fluid 840. The seal solution may be configured to harden and seal the ER fluid within the micro-chambers 838.

The lamination section 824 may be configured to laminate the films 830 and 832 together. Although not shown, the film 832 may undergo a similar process as the film 830 so as to include micro-chambers 838 filled with the ER fluid 840, or the film 832 may lack micro-chambers 838 and ER fluid 840.

Optionally, an adhesive (not shown) may be deposited on one or both of the films 830, 832 prior to reaching the lamination section 824 so as to couple the two films 830 together after lamination. The adhesive may include a UV-hardening type adhesive, or other suitable adhesive. The lamination section 824 laminates the films 830 and 832 together to form a second layer material 842 including interconnected micro-chambers 838 including ER fluid 810 so as to correspond to the interconnected micro-chambers 21.2 of a finished haptic feedback device such as the haptic feedback device 108 described hereinabove.

The cutter 826 may be configured to section the second layer material 842 into segments of a predetermined size and/or shape. For instance, the cutter 826 may be configured to section the second layer material 842 into patterned segments suitable for integration into a finished haptic feedback device.

The assembly system 812 may be configured to assemble the first layer material (not shown) from the first-layer forming system 808 together with the second layer material 842 from the second-layer forming system 810 and/or various other materials to form finished haptic feedback devices. The various other materials may include pre-fabricated apparel such as gloves or other items with which the first layer material and second layer material may be integrated. The assembly system 812 may include, for example, a laminator 844, a cutter 846 and a sewing machine 848.

The laminator 844 may be configured to couple the first layer material (not shown) and the second layer material 842 together to form a combined material (not shown).

The cutter 846 may be configured to cut the combined material according to a predetermined pattern associated with a target haptic feedback device. For instance, if the target haptic feedback device is a glove, the combined material may be cut into a pattern including finger and palm sections. Alternately, the cutter 846 may be configured to separately cut the first layer material and second layer material into a predetermined pattern before the laminator 844 couples the cut first layer material and second layer material together.

The sewing machine 848 or other device may be configured to secure the cut combined material within a glove or other item of apparel or other carrier such that when the glove or other item of apparel or other carrier is worn by a person, the combined material including first and second layer materials is positioned proximate one or more body parts of a person which can sense haptic information.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc," is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled, in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and, that various modifications may be made without departing from the scope and spirit of the present disclosure. Accordingly, the various embodiments disclosed herein are not intended to be limiting, with the true scope and spirit being indicated by the following claims.

The invention claimed is:

1. A haptic feedback device, comprising:
a first layer that includes a plurality of discrete fluid chambers;
a second layer coupled to the first layer, wherein the second layer includes a plurality of interconnected micro-chambers that contain an electro-rheological fluid and the plurality of interconnected micro-chambers are in fluid communication with each other; and
a plurality of electrodes positioned on opposite first and second sides of the plurality of interconnected micro-chambers.

2. The haptic feedback device of claim 1, wherein the haptic feedback device comprises a glove configured to be worn on a hand of a person.

3. The haptic feedback device of claim 2, wherein the glove includes a plurality of fingers and a palm and each of the plurality of discrete fluid chambers corresponds to a different one of the plurality of fingers or the palm.

4. The haptic feedback device of claim 2, wherein:
the glove includes a plurality of fingers and a palm;
the plurality of discrete fluid chambers are divided into a plurality of subsets;
each of the plurality of subsets includes multiple discrete fluid chambers; and
each of the plurality of subsets corresponds to a different one of the plurality of fingers or the palm.

5. The haptic feedback device of claim 1, wherein:
the second layer comprises first and second films that contain the electro-rheological fluid therebetween; and
each of the plurality of electrodes is substantially enclosed within a respective one of the first or second films.

6. The haptic feedback device of claim 1, wherein:
each of the plurality of electrodes includes a strip of substantially conductive material;
each of a first subset of the plurality of electrodes positioned on the first side of the plurality of interconnected micro-chambers is aligned in a first direction; and
each of a second subset of the plurality of electrodes positioned on the second side of the plurality of interconnected micro-chambers is aligned in a second direction substantially orthogonal to the first direction.

7. The haptic feedback device of claim 1, wherein each of the first and second layers comprises a resin film that includes one or more of polyethylene terephthalate (PET), polycarbonate (PC), polyimide, polyamide, or polyamide-imide (PAI).

8. The haptic feedback device of claim 1, wherein the electro-rheological fluid has a yield stress greater than 100 kilopascals (kPa).

9. The haptic feedback device of claim 8, wherein the electro-rheological fluid has a yield stress of about 200 kPa.

10. The haptic feedback device of claim 1, wherein the electro-rheological fluid comprises solid particles dispersed in an oil.

11. The haptic feedback device of claim 10, wherein the solid particles include at least one of: titanium oxide ("TiO$_2$") polyaniline, microencapsulated polyaniline, poly(naphthalene quinone) radical, or poly(p-phenylene).

12. The haptic feedback device of claim 10, wherein the oil includes silicon oil.

13. The haptic feedback device of claim 1, wherein the plurality of electrodes are configured to selectively and independently apply an electric field across each of the plurality of interconnected micro-chambers.

14. A system, comprising:
a haptic feedback device, wherein the haptic feedback device comprises:
a first layer that includes a plurality of discrete fluid chambers;
a second layer coupled to the first layer, wherein the second layer includes a plurality of interconnected micro-chambers that contain an electro-rheological fluid; and
a plurality of electrodes positioned on opposite first and second sides of the plurality of interconnected micro-chambers;
a pressure source hydraulically coupled to the plurality of discrete fluid chambers;
a power source electrically coupled to the plurality of electrodes; and
a control module electrically coupled to the pressure source and the power source.

15. The system of claim 14, further comprising a fluid configured to be used by the pressure source to selectively pressurize the plurality of discrete fluid chambers included in the haptic feedback device.

16. The system of claim 15, wherein the fluid comprises a gas or liquid with a substantially uniform viscosity.

17. The system of claim 15, wherein the fluid includes air, water or oil.

18. The system of claim 15, wherein the fluid has a viscosity between about 0 centipoise ("cP") and about 800 cP.

19. The system of claim 18, wherein the fluid has a viscosity between about 0.0018 cP and about 100 cP.

20. The system of claim 14, wherein the control module is configured to provide a data signal to the pressure source and the power source that represents a state of contact between the person and a virtual object.

21. The system of claim 20, wherein:
the pressure source is configured to selectively pressurize a subset of the plurality of discrete fluid chambers according to the data signal; and
the power source is configured to selectively apply an electric field through a subset of the plurality of electrodes across a subset of the plurality of interconnected micro-chambers to alter an apparent viscosity of a portion of the electro-rheological fluid contained in the subset of the plurality of interconnected micro-chambers according to the data signal.

22. A method to haptically represent virtual objects in an augmented reality space, the method comprising:
selectively pressurizing a subset of a plurality of discrete fluid chambers included in a first layer of a haptic feedback device;
generating a hardness distribution in a second layer of the haptic feedback device, the second layer being coupled to the first layer; and
transmitting pressure from the first layer through the hardness distribution of the second layer to evoke a haptic sense indicative of contact with the virtual object and a force sense indicative of a hardness of the virtual object.

23. The method of claim 22, wherein generating the hardness distribution in the second layer includes selectively applying an electric field across a subset of a plurality of interconnected micro-chambers of the second layer to alter an apparent viscosity of a portion of an electro-rheological fluid contained in the subset of the plurality of interconnected micro-chambers, wherein the electro-rheological fluid is contained throughout the plurality of interconnected micro-chambers.

24. The method of claim 23, further comprising increasing a magnitude of the applied electric field to increase a magnitude of the hardness of the virtual object perceived by a person that wears the haptic feedback device.

25. The method of claim 23, further comprising decreasing a magnitude of the applied electric field to decrease a magnitude of the hardness of the virtual object perceived by a person that wears the haptic feedback device.

26. The method of claim 22, wherein the haptic feedback device comprises:

a first layer that includes a plurality of discrete fluid chambers;

a second layer coupled to the first layer, wherein the second layer includes a plurality of interconnected micro-chambers that contain an electro-rheological fluid; and a plurality of electrodes positioned on opposite first and second sides of the plurality of interconnected micro-chambers.

27. A haptic feedback device, comprising:

a first layer that includes a plurality of discrete fluid chambers;

a second layer coupled to the first layer, wherein the second layer includes a plurality of interconnected micro-chambers that contain an electro-rheological fluid; and a plurality of electrodes positioned on opposite first and second sides of the plurality of interconnected micro-chambers, wherein the haptic feedback device comprises a glove.

28. The haptic feedback device of claim 27, wherein the glove includes a plurality of fingers and a palm and each of the plurality of discrete fluid chambers corresponds to a different one of the plurality of fingers or the palm.

29. The haptic feedback device of claim 27, wherein:

the glove includes a plurality of fingers and a palm;

the plurality of discrete fluid chambers are divided into a plurality of subsets;

each of the plurality of subsets includes multiple discrete fluid chambers; and each of the plurality of subsets corresponds to a different one of the plurality of fingers or the palm.

30. The haptic feedback device of claim 27, wherein the electro-rheological fluid has a yield stress greater than 100 kilopascals (kPA).

31. A haptic feedback device, comprising:

a first layer that includes a plurality of discrete fluid chambers;

a second layer coupled to the first layer, wherein the second layer includes a plurality of interconnected micro-chambers that contain an electro-rheological fluid; and a plurality of electrodes positioned on opposite first and second sides of the plurality of interconnected micro-chambers, wherein:

each of the plurality of electrodes includes a strip of substantially conductive material;

each of a first subset of the plurality of electrodes positioned on the first side of the plurality of interconnected micro-chambers is aligned in a first direction; and each of a second subset of the plurality of electrodes positioned on the second side of the plurality of interconnected micro-chambers is aligned in a second direction substantially orthogonal to the first direction.

32. The haptic feedback device of claim 31, wherein:

the second layer comprises first and second films that contain the electro-rheological fluid therebetween; and each of the plurality of electrodes is substantially enclosed within a respective one of the first or second films.

33. The haptic feedback device of claim 31, wherein the electro-rheological fluid comprises solid particles dispersed in an oil.

34. The haptic feedback device of claim 31, wherein the plurality of electrodes are configured to selectively and independently apply an electric field across each of the plurality of interconnected micro-chambers.

\* \* \* \* \*

UNITED STATES PATENT AND TRADEMARK OFFICE
CERTIFICATE OF CORRECTION

PATENT NO. : 8,922,355 B2
APPLICATION NO. : 13/143093
DATED : December 30, 2014
INVENTOR(S) : Kusuura It is certified that error appears in the above-identified patent and that said Letters Patent is hereby corrected as shown below:

Title Page, (56), under "OTHER PUBLICATIONS", in Column 2, Lines 2-3, delete "IEE Transactions of Afftective" and insert -- IEEE Transactions of Affective --, therefor.

Title Page 2, (56), under "OTHER PUBLICATIONS", in Column 2, Line 11, delete "ForceDisplay" and insert -- Force Display --, therefor.

Title Page 2, (56), under "OTHER PUBLICATIONS", in Column 2, Line 14, delete ""Electroheological Fludis,"" and insert -- Electrorheological Fluids --, therefor.

In the Specification

In Column 1, below Title, insert -- CROSS-REFERENCE TO RELATED APPLICATIONS
The present application is a U.S. national stage filing under 35 U.S.C. §371 of International Application No. PCT/US2011/021191, filed on Jan. 13, 2011. --.

In Column 3, Line 50, delete "pressurized," and insert -- pressurized --, therefor.

In Column 7, Line 27, delete "applied," and insert -- applied --, therefor.

In Column 9, Line 23, delete "funning" and insert -- forming --, therefor.

In Column 9, Line 64, delete "hut" and insert -- but --, therefor.

In Column 10, Line 50, delete "810" and insert -- 840 --, therefor.

In Column 10, Line 51, delete "21.2" and insert -- 212 --, therefor.

In Column 12, Line 9, delete "etc,"" and insert -- etc." --, therefor.

Signed and Sealed this
Nineteenth Day of May, 2015

Michelle K. Lee
*Director of the United States Patent and Trademark Office*

In Column 12, Line 35, delete "skilled,"" and insert -- skilled --, therefor.

In Column 12, Line 55, delete "and," and insert -- and --, therefor.